(12) United States Patent
Kohlenberg et al.

(10) Patent No.: US 9,401,902 B2
(45) Date of Patent: Jul. 26, 2016

(54) METHOD FOR EXCHANGING STRONG ENCRYPTION KEYS BETWEEN DEVICES USING ALTERNATE INPUT METHODS IN WIRELESS PERSONAL AREA NETWORKS (WPAN)

(71) Applicant: Intel Corporation, Santa Clara, CA (US)

(72) Inventors: Tobias M. Kohlenberg, Portland, OR (US); Selim Aissi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/156,686

(22) Filed: Jan. 16, 2014

(65) Prior Publication Data

US 2014/0310525 A1      Oct. 16, 2014

Related U.S. Application Data

(63) Continuation of application No. 11/646,013, filed on Dec. 27, 2006, now Pat. No. 8,688,986.

(51) Int. Cl.

| *H04L 29/06* | (2006.01) |
| *H04W 12/04* | (2009.01) |
| *H04L 9/08* | (2006.01) |

(52) U.S. Cl.
CPC ............ *H04L 63/061* (2013.01); *H04L 9/0838* (2013.01); *H04L 63/08* (2013.01); *H04L 63/18* (2013.01); *H04W 12/04* (2013.01); *H04L 2209/80* (2013.01)

(58) Field of Classification Search
CPC ....... H04L 63/061; H04L 63/08; H04L 63/18; H04L 9/0838; H04L 2209/80
USPC .................................................. 713/169, 171
See application file for complete search history.

(56) References Cited

U.S. PATENT DOCUMENTS 6,694,431 B1 *   2/2004   Binding .............. H04L 63/0428
                                                        713/152
6,757,909 B1   6/2004   Maruo et al.
(Continued)

FOREIGN PATENT DOCUMENTS

| CN | 1523807 A | 8/2004 |
| EP | 1450233 A2 | 8/2004 |

(Continued)

OTHER PUBLICATIONS

Sajasi, "An adaptive image Steganographic scheme based on noise visibility function and an optimal chaotic base encryption method", 2015, Applied Soft Computing, p. 375-389.*

(Continued)

*Primary Examiner* — Thanhnga B Truong
*Assistant Examiner* — Gregory Lane
(74) *Attorney, Agent, or Firm* — Barnes & Thornburg LLP

(57) ABSTRACT

A method for exchanging strong encryption keys between devices using alternate input methods. At least two devices that want to communicate with one another are set in key exchange mode. The at least two devices are to communicate with one another using a short range radio or personal area network. The at least two devices negotiate with one another to determine which of the at least two devices will generate an encryption key, wherein device A represents the negotiated device and device B represents the non-negotiated device. Device A generates the encryption key and transmits the encryption key to device B using an out-of band transmission channel. The out-of-band transmission channel may be transmitting the encryption key via audio tones. A validation process determines whether the transmission of the encryption key via the out-of-band transmission channel was successful. If the encryption key has been successfully validated, the at least two devices are enabled to automatically accept communications between them over the short range radio or personal area network.

18 Claims, 3 Drawing Sheets

(a)

(b)

(56) References Cited

U.S. PATENT DOCUMENTS

| | | | |
|---|---|---|---|
| 7,043,633 B1* | 5/2006 | Fink et al. | 713/162 |
| 8,688,986 B2 | 4/2014 | Kohlenberg et al. | |
| 2002/0078345 A1* | 6/2002 | Sandhu | H04L 9/0825 713/155 |
| 2002/0131592 A1* | 9/2002 | Hinnant | 380/46 |
| 2002/0186846 A1* | 12/2002 | Nyberg | H04L 9/0841 380/273 |
| 2003/0226015 A1* | 12/2003 | Neufeld et al. | 713/166 |
| 2003/0233550 A1* | 12/2003 | Brickell | 713/171 |
| 2004/0015693 A1 | 1/2004 | Kitazumi | |
| 2004/0096058 A1* | 5/2004 | Cho | G09C 5/00 380/28 |
| 2004/0161111 A1* | 8/2004 | Sherman | 380/283 |
| 2005/0175216 A1* | 8/2005 | Bloom et al. | 382/100 |
| 2005/0193203 A1 | 9/2005 | Freeman et al. | |
| 2005/0232635 A1 | 10/2005 | Aronson et al. | |
| 2005/0273609 A1* | 12/2005 | Eronen | H04L 63/0428 713/171 |
| 2006/0034456 A1* | 2/2006 | McGough | H04L 9/0844 380/30 |
| 2006/0128305 A1 | 6/2006 | Delalat | |
| 2006/0161791 A1 | 7/2006 | Bennett | |
| 2006/0205388 A1 | 9/2006 | Semple et al. | |
| 2007/0076868 A1* | 4/2007 | Ming | G09C 5/00 380/54 |
| 2007/0106892 A1 | 5/2007 | Engberg | |
| 2007/0204163 A1 | 8/2007 | Andrews et al. | |
| 2007/0229678 A1* | 10/2007 | Barrus et al. | 348/231.3 |
| 2007/0233860 A1* | 10/2007 | Lillie et al. | 709/225 |
| 2008/0037779 A1* | 2/2008 | Seman | H02J 7/0004 380/46 |
| 2008/0046728 A1 | 2/2008 | Lyle | |
| 2008/0056501 A1 | 3/2008 | McGough | |
| 2008/0070501 A1* | 3/2008 | Wyld | H04L 63/08 455/41.2 |
| 2008/0123849 A1 | 5/2008 | Samayamantry et al. | |
| 2008/0162937 A1 | 7/2008 | Kohlenberg et al. | |
| 2008/0304439 A1 | 12/2008 | Keevill et al. | |
| 2009/0268909 A1 | 10/2009 | Girao et al. | |

FOREIGN PATENT DOCUMENTS

| | | | |
|---|---|---|---|
| EP | 1742464 A1 | | 1/2007 |
| EP | 1940072 A1 | | 7/2008 |
| JP | 01293724 A | | 11/1989 |
| JP | 02094835 A | | 4/1990 |
| JP | 11252069 A | | 9/1999 |
| JP | 2002124960 A | | 4/2002 |
| JP | 2003518879 A | | 6/2003 |
| JP | 2004254320 A | | 9/2004 |
| JP | 2005244988 A | | 9/2005 |
| JP | 2006108886 A | | 4/2006 |
| JP | 2006190051 A | | 7/2006 |
| JP | 2006332903 A | | 12/2006 |
| JP | 2007533275 A | | 11/2007 |
| JP | 2009504051 A | | 1/2009 |
| JP | 2009540709 A | | 11/2009 |
| JP | 2010503323 A | | 1/2010 |
| KR | EP1742464 | * | 7/2005 |
| WO | 02056536 A1 | | 7/2002 |

OTHER PUBLICATIONS

Notification to Grant Right received for Chinese Patent Application No. 200710306601.5, mailed Feb. 25, 2014, 5 pages of Notification including 3 pages of unofficial English translation.

Official Communication received for Chinese Patent Application No. 200710306601.5, mailed Nov. 14, 2013, 9 pages of Chinese Official Communication and 15 pages of unofficial English translation.

Official Communication received for Chinese Patent Application No. 200710306601.5, mailed Jun. 13, 2013, 5 pages of Chinese Official Communication and 8 pages of unofficial English translation.

Official Communication received for European Patent Application No. 07254928.0, mailed Mar. 21, 2013, 6 pages.

Official Communication received for Chinese Patent Application No. 200710306601.5, mailed Aug. 25, 2011, 15 pages of Official Communication including 10 pages of unofficial English translation.

European Search Report received for European Patent Application No. 07254928.0, mailed Aug. 5, 2009, 6 pages.

Official Communication received for Chinese Patent Application No. 200710306601.5, mailed Mar. 8, 2011, 5 pages of Official Communication and 3 pages of unofficial English translation.

Official Communication received for Japanese Patent Application No. 2007-332027, mailed Jan. 4, 2011, 6 pages of Official Communication and 5 pages of unofficial English translation.

Official Communication received for Chinese Patent Application No. 200710306601.5, mailed Jun. 12, 2010, 6 pages of Official Communication and 8 pages of unofficial English translation.

Official Communication received for Korean Patent Application No. 10-2007-137949, mailed Jan. 30, 2010, 3 pages of Official Communication and 4 pages of unofficial English translation.

Prateek, "Security Analysis of Voice-over-IP Protocols," 2007, University of Texas at Austin, pp. 1-21.

"PALM: Support Knowledge Library; Bluetooth Pairing: definition and overview," Sep. 26, 2005, Article ID 14817, http://kb.palmone.com/SRVS/CGI-BIN/WEBCGI.EXE?New.
Kb=PalmSupportKB,ts=Pal- m.sub.--External2001, case=obj(14817).

"Bluetooth—An Overview, Establishing Network Connections," Apr. 17, 2004, http://www.swedetrack.com/images/bluet14.htm.

"Bluetooth—An Overview, What is 'Bluetooth?'," Apr. 17, 2004, http://www.swedetrack.com/images/bluet00.htm.

"Bluetooth—An Overview, What about Bluetooth's security?," Apr. 17, 2004, http://www.swedetrack.com/images/bluet08.htm.

Stajano et al., "The Resurrecting Duckling: Security Issues for Ubiquitous Computing," IEEE Computing Magazine, Apr. 2002, vol. 35, Issue 4, pp. 22-26.

* cited by examiner

METHOD FOR EXCHANGING STRONG ENCRYPTION KEYS BETWEEN DEVICES USING ALTERNATE INPUT METHODS IN WIRELESS PERSONAL AREA NETWORKS (WPAN)

CROSS-REFERENCE TO RELATED U.S. PATENT APPLICATION

This application is a continuation application of U.S. application Ser. No. 11/646,013, entitled "METHOD FOR EXCHANGING STRONG ENCRYPTION KEYS BETWEEN DEVICES USING ALTERNATE INPUT METHODS IN WIRELESS PERSONAL AREA NETWORKS (WPAN)," filed Dec. 27, 2006.

BACKGROUND

1. Field of the Invention

The present invention is generally related to the field of mobile security. More particularly, the present invention is related to a method for exchanging strong encryption keys between mobile devices using alternate data transfer methods in wireless personal area networks (WPAN).

2. Description

For local, short-range, and personal area networks, Bluetooth and the emerging UWB (Ultra-Wide-Band) technologies remain the leading protocols in the market today. It is estimated that there are over one billion Bluetooth-enable handhelds in worldwide use today.

One of the most challenging aspects of short-range radiolink technologies, such as Bluetooth, is security. For example, with Bluetooth, link and encryption keys are derived from a PIN (personal identification number)/passkey code that users, of the devices that are to communicate with one another, must physically/manually enter during device-pairing. With devices that enable entry of the PIN/passkey code via an interface device, such as a keypad, the PIN/passkey code may be a user or manufacturer-selected code that must be entered on the spot. Devices that accept user selected PIN/passkey codes that must be entered on the spot may include, but are not limited to, cell phones and laptop computers. Devices that do not have an interface for changing the PIN/passkey code on the device may have a PIN/passkey that is unchangeable. In other words, the PIN/passkey remains the same and is usually set by the manufacturer. Devices with unchangeable PIN/passkey codes may include, but are not limited to, hands-free headsets and printers.

Oftentimes manufacturers will set the same PIN/passkey on each device of its kind. For example, all hands-free headsets manufactured by XYZ Corporation may all have the PIN 3958, which is not secure because it is known for all XYZ wireless devices of its kind.

The purpose of the PIN/passkey is to enable two or more devices wanting to communicate with one another to discover each other and create an encryption key that enables the devices to join what is called a trusted pair or a trusted piconet. The encryption key is used to protect all of the information that is to be exchanged between the devices. The problem that exists today is that the encryption key is being created over the same channel in which the encryption key is to be used to protect communications between the devices, thereby making it vulnerable for attack. In other words, when there are other devices within communication range of a device having the same PIN/passkey in which communications are not desired, these undesirable devices may derive the encryption key, making the desired communicating devices vulnerable to attack.

Currently, the strength of security for wireless USB (Universal Serial Bus), WLAN (Wireless Local Area Networks), short-range radio networks, and personal area networks, such as, for example, Bluetooth and UWB, is based on the strength (Entropy, randomness, and size) of the PIN/passkey code. The more random and the longer the size of the PIN/passkey code, the stronger the PIN/passkey code. Users of devices in which the user has to enter the PIN/passkey code do not want to enter a PIN/passkey that is long in length, thereby jeopardizing the security of the trusted pair or trusted group. For example, users are more comfortable entering a 4-character or less PIN/passkey, but are very uncomfortable with having to enter a PIN/passkey of a greater length than four digits. In fact, with regards to the typical users of such devices, the shorter the PIN, the better.

Thus, what is needed is a method for enabling an out-of-band communications channel, separate and distinct from the communication channel in which communications between the devices are to be protected, to exchange the encryption key for wireless short-range radio and personal area networks, such as, but not limited to, Bluetooth and UWB. What is further needed is a method for enabling transmission of a longer PIN without requiring the user to enter the PIN.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
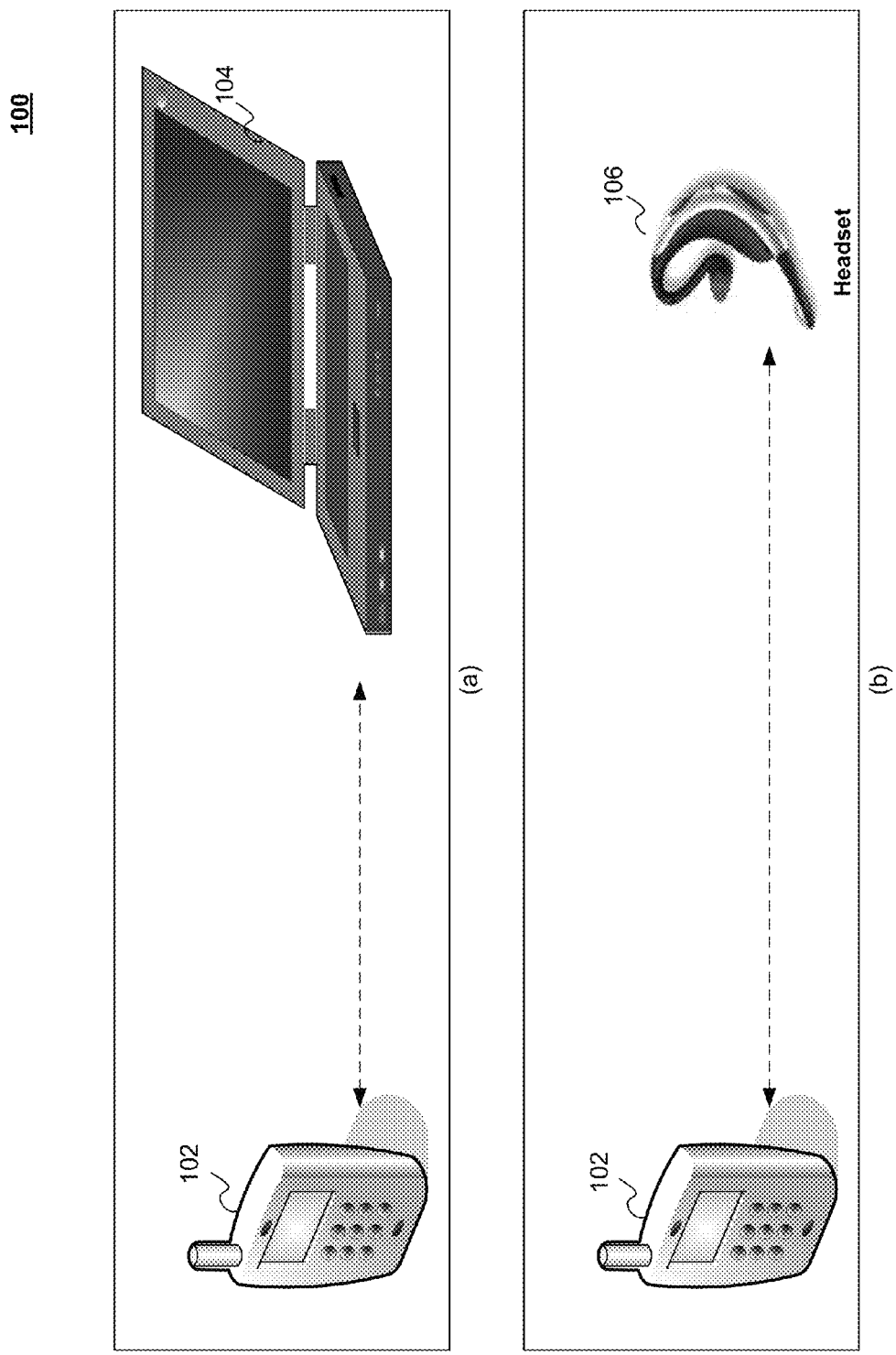
FIGS. 1a and 1b are diagrams illustrating exemplary devices that may communicate using a wireless protocol for local, short-range, and personal area networks that may require device pairing according to an embodiment of the present invention.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to methods for exchanging strong encryption keys between devices that operate within a short-range radio or personal area network by using alternate data transfer mechanisms to exchange information for use in encryption and authentication. In one embodiment, this may be accomplished by using audio tones to exchange the encryption key during device pairing. In another embodiment, this may be accomplished by displaying a picture with the encryption key embedded in the picture to exchange the encryption key during device pairing. Using an alternate data transfer mechanism (also referred to as an out-of-band encryption key exchange) enhances device security by enabling stronger encryption keys to be employed (that is, encryption keys of a much greater length than is feasible for a human to manually enter into the device). Embodiments of the present invention use speakers, microphones, displays, and cameras that are already available in the devices that agree to communicate with each other, and therefore, do not require any additional hardware to be built or placed on the devices to enable the stronger security.

Although embodiments of the present invention are described with respect to Bluetooth devices, the invention is not limited to Bluetooth. Those skilled in the relevant art(s) will know that other types of wireless protocols for local, short-range, and personal area networks, including Wireless USB and WLAN networks, which require device pairing are equally applicable. For example, embodiments of the present invention may also be applicable to UWB protocols as well.

The present invention is also described with respect to communications between two devices. This is done for illustrative purposes only. One skilled in the relevant art(s) would know that the teachings of embodiments of the present invention may also extend to communications between more than two devices. For example, embodiments of the present invention may also be applicable to a plurality of Bluetooth devices that communicate using a piconet formation.

Note that throughout this Specification, the terms "key exchange mode" and "pairing mode" may be used interchangeably.

FIGS. 1a and 1b are diagrams illustrating exemplary devices that may communicate using a wireless protocol for local, short-range, and personal area networks that may require device pairing according to an embodiment of the present invention. FIG. 1a illustrates a cell phone 102 communicating with a laptop computer 104 using a wireless protocol for local, short-range, or personal area networks that require device pairing. Both cell phone 102 and laptop computer 104 include a microphone (not explicitly shown), a speaker (not explicitly shown), and a display. Thus, the hardware of cell phone 102 and laptop computer 104 enable the use of an out-of-band encryption key exchange using audio tones for device-to-device pairing.

Cell phone 102 may also include a camera. The hardware component of a camera for cell phone 102 and displays for both cell phone 102 and laptop computer 104 enable the use of an out-of-band encryption key exchange using video for device-to-device pairing.

FIG. 1b illustrates cell phone 102 communicating with a hands-free headset 106. As previously indicated, a hands-free headset does not have an interface for changing the PIN/passkey. Both cell phone 102 and hands-free headset 106 both include a microphone and a speaker. Thus, with the present invention, hands-free headset 106 may change its encryption key using the microphones and speakers. In this instance, cell phone 102 and hands-free headset 106 may form a trusted pair using audio tones for an out-of-band encryption key exchange during pairing.

Although FIGS. 1a and 1b illustrate cell phones, laptops, and hands-free headsets as small form factor devices for pairing, these devices are for illustration purposes only. Other devices that may use a wireless protocol for local, short-range, and personal area networks that may require device pairing are also applicable. Such devices may include, but are not limited to, smartphones, ultra-mobile devices, printers, wireless projectors, desktop PCs, etc.

Figure 2:
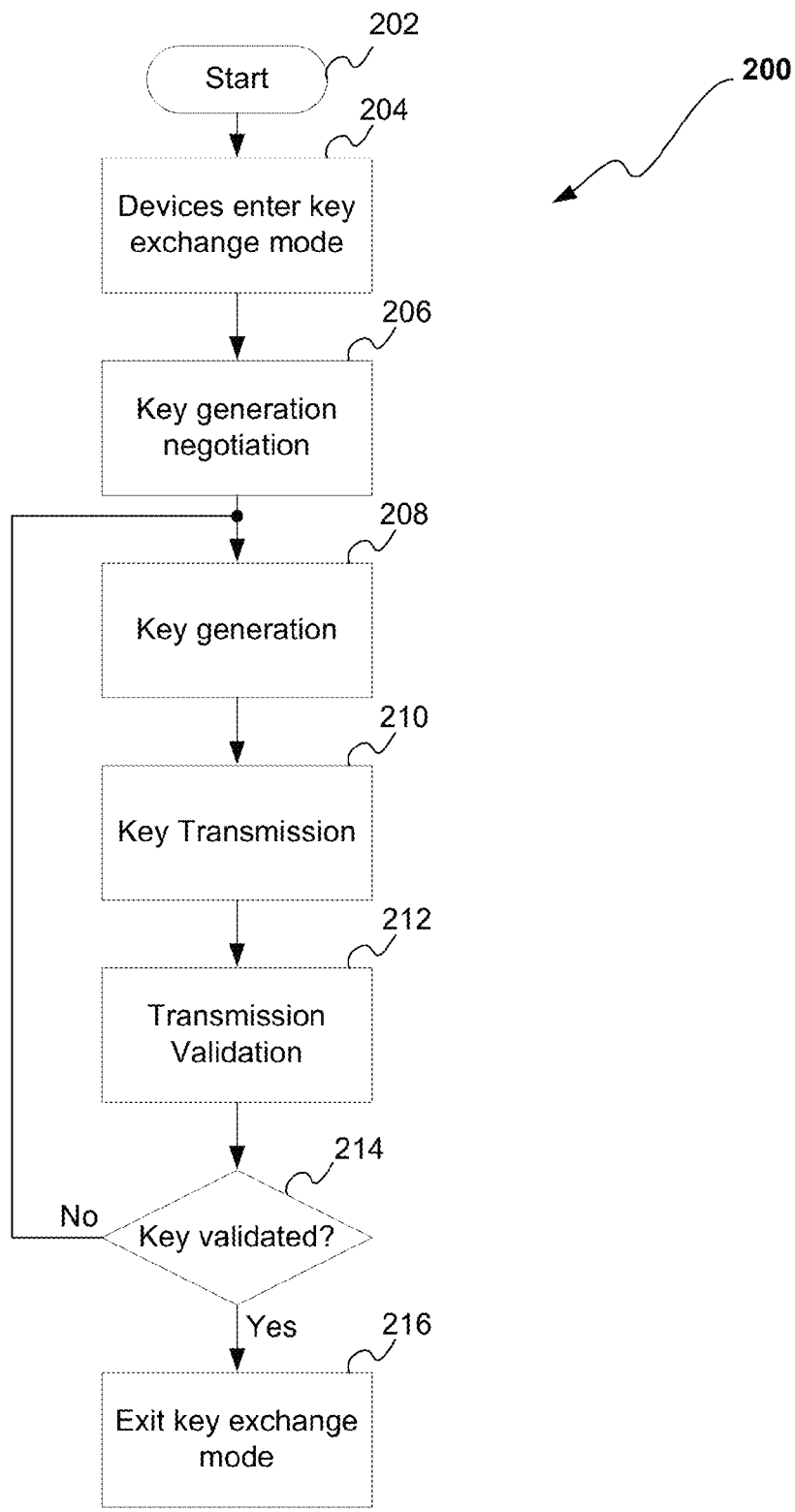
FIG. 2 is a flow diagram describing an exemplary method for exchanging strong encryption keys between devices using alternate input methods according to an embodiment of the present invention.

FIG. 2 is a flow diagram describing an exemplary method for exchanging strong encryption keys between devices using alternate input methods according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, the devices that are to communicate with one another are placed in key exchange mode (also referred to as "pairing mode"). For example, with a cell phone, one may first enter a configuration mode to select or say "pairing mode." With a headset, one may hold the power button in the down position for an extended period of time to enter the pairing mode. Thus, the process for entering the exchange mode may be different for each device, and is well documented by each manufacturer of a device. The process then proceeds to block 206.

In block 206, the devices negotiate as to who will generate the encryption key. This may be a manual or automated process. In one embodiment, the device with more processing power may initiate the process and drive the negotiation. For example, returning to FIG. 1a, when cell phone 102 and laptop 104 negotiate the generation of the key, laptop 104, which has more processing power than cell phone 102, may initiate the process and drive the negotiation. In FIG. 1b, when cell phone 102 and headset 106 negotiate the generation of the encryption key, cell phone 102, which has more processing power, may initiate the process and drive the negotiation. In another embodiment of the present invention, the device that drives the negotiation and generates the encryption key may not be based on processing power, but may be based on the device that initiated the communication. Yet in another embodiment of the present invention, the device to drive the negotiation and generate the encryption key may be the device that offers first to generate the key. The process then proceeds to block 208.

In block 208, the encryption key is generated by the device that negotiated to generate the key. For simplicity, this device is referred to hereinafter as device A. Background noise may be used as a random seed to be used to generate the encryption key. The random seed may be input into a random number generator to obtain the encryption key. The process then proceeds to block 210.

In block 210, the encryption key is transmitted from device A to device B (the device to receive the encryption key) via an out-of-band transmission channel. In one embodiment, the encryption key is transmitted from device A to device B using a high speed audio transmission. In other words, the encryption key is transmitted in the form of audio tones. The audio tones allow for a much longer encryption key (encryption key >>16 characters), and therefore, provides an encryption key with much stronger security.

In another embodiment, the encryption key is transmitted via a video display. Device A creates a picture with the encryption key embedded in the picture. The encryption key is not visible to the human eye, but can be deciphered using software that is resident on both device A and device B. Device A presents the picture on its display. Device B, which includes a camera, captures a picture of the display using the camera and then interprets the encryption key embedded in the picture using software logic.

In block 212, the encrypted key exchange is validated via a wireless protocol, such as, but not limited to, Bluetooth, UWB, or another wireless protocol that requires pairing. The process then proceeds to decision block 214.

In decision block 214, it is determined whether the encryption key exchange was successfully validated. If it is determined that the encryption key was not successfully validated, the process of generating an encryption key (block 208), transmitting the encryption key (block 210) and validating the encryption key (block 212) is repeated until the validation process is successful.

Returning to decision block 214, if it is determined that the encryption key was successfully validated, the process proceeds to block 216. In block 216, a trusted pair has been established, and the process ends by enabling the devices to exit the key exchange mode. Once the encryption key has been successfully exchanged, the devices may automatically accept communications between them without having to discover or authenticate one another in a secure manner.

Figure 3:
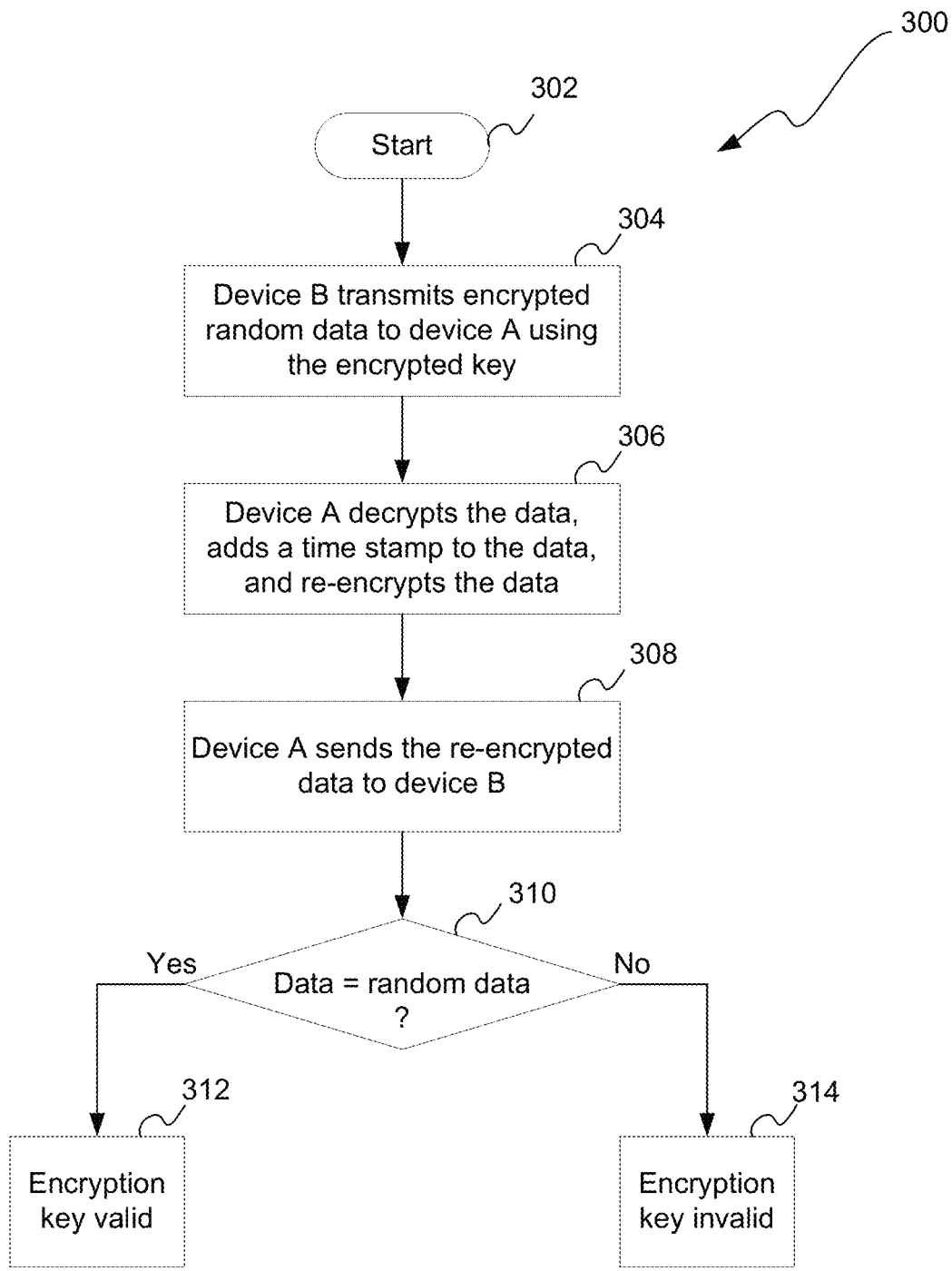
FIG. 3 is a flow diagram illustrating an exemplary method for validating an encryption key exchange between devices using alternate input methods according to an embodiment of the present invention.

FIG. 3 is a flow diagram 300 illustrating an exemplary method for validating an encryption key exchange between devices using alternate input methods according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, device B, after receiving the encryption key, transmits encrypted random data to device A via a wireless transmission, such as, for example, Bluetooth, UWB, or any other short range wireless protocol that requires pairing using the encrypted key. The process then proceeds to block 306.

In block 306, device A decrypts the data, adds a time stamp to the data, and re-encrypts the data. The process then proceeds to block 308.

In block 308, device A sends the re-encrypted data back to device B. If, in decision block 310, device B receives the random data back that it sent to device A in block 304 with the time stamp, then the encryption key is validated (block 312). Returning to decision block 310, if device B does not receive the random data back with the time stamp, then the encryption key is not validated (block 314).

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set-top boxes, cellular telephones, and other electronic devices that each includes one or more processors, a storage medium readable by the one or more processors (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, multi-core processor systems and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. One or more non-transitory, machine-readable media comprising a plurality of instructions stored thereon that, when executed by a computing device, causes the computing device to:
   communicate, in a key exchange mode, with another computing device via an in-band transmission channel;
   negotiate, via the in-band transmission channel, with the another computing device to determine which computing device will generate an encryption key;
   generate the encryption key using audible background noise as a random seed to a random number generator in response to a determination that the computing device is to generate the encryption key;

generate a cryptographic picture based on the encryption key, wherein the cryptographic picture includes the encryption key embedded in the cryptographic picture;

transmit the encryption key to the another computing device, wherein to transmit the encryption key to the another computing device comprises to display the cryptographic picture on a display of the computing device such that the cryptographic picture is visible to the another computing device;

determine whether the encryption key has been successfully validated by the another computing device based on the cryptographic picture; and enable the computing device to automatically accept communications from the another computing device over the in-band transmission channel in response to a determination that the encryption key has been successfully validated.

2. The one or more non-transitory, machine-readable media of claim 1, wherein to negotiate with the another computing device comprises to negotiate with the another computing device to determine which computing device will generate an encryption key based on a determination of which of the computing devices comprises more processing power.

3. The one or more non-transitory, machine-readable media of claim 1, wherein the encryption key is hidden in the cryptographic picture.

4. The one or more non-transitory, machine-readable media of claim 1, wherein the encryption key has a character length greater than sixteen characters.

5. The one or more non-transitory, machine-readable media of claim 1, wherein to determine whether the encryption key has been successfully validated by the another computing device comprises to:

receive, subsequent to transmission of the encryption key, encrypted random data from the another computing device via a wireless transmission that requires pairing, wherein the encrypted random data comprises random data encrypted with the encryption key;

decrypt the encrypted random data received from the another computing device with the encryption key to obtain the random data;

add a time stamp to the random data;

re-encrypt the random data with the encryption key, wherein the re-encrypted random data includes the time stamp; and transmit the re-encrypted random data that includes the time stamp to the another computing device.

6. The one or more non-transitory, machine readable media of claim 1, wherein the plurality of instructions further cause the computing device to:

regenerate the encryption key using audible background noise a random seed to the random number generator in response to a determination that the encryption key is not validated;

generate another cryptographic picture based on the regenerated encryption key, wherein the another cryptographic picture includes the regenerated encryption key embedded in the another cryptographic picture;

display the another cryptographic picture on the display of the computing device; and determine whether the regenerated encryption key has been successfully validated by the another computing device based on the another cryptographic picture.

7. A computing device for secure communications, the computing device comprising:

a display;

a processing circuitry; and a memory having stored therein a plurality of instructions that, when executed by a processor, cause the processing circuitry to:

establish an in-band transmission channel with another computing device in a key exchange mode of the computing device;

negotiate, via the in-band transmission channel, with the another computing device to determine which device will generate an encryption key;

generate the encryption key using audible background noise as a random seed to a random number generator in response to a determination that the computing device is to generate the encryption key;

generate a cryptographic picture based on the encryption key, wherein the cryptographic picture includes the encryption key embedded in the cryptographic picture;

transmit the encryption key to the another computing device, wherein to transmit the encryption key to the another computing device comprises to display the cryptographic picture on the display such that the cryptographic picture is visible to the another computing device;

determine whether the encryption key has been successfully validated by the another computing device based on the cryptographic picture; and enable the computing device to automatically accept communications from the another computing device over the in-band transmission channel in response to a determination that the encryption key has been successfully validated.

8. The computing device of claim 7, wherein to negotiate with the another computing device comprises to negotiate with the another computing device to determine which computing device will generate an encryption key based on a determination of which of the computing devices comprises more processing power.

9. The computing device of claim 7, wherein to generate the encryption key comprises to capture the audible background noise.

10. The computing device of claim 7, wherein the encryption key is hidden in the cryptographic picture.

11. The computing device of claim 7, wherein the encryption key has a character length greater than sixteen characters.

12. The computing device of claim 7, wherein to determine whether the encryption key has been successfully validated by the another computing device comprises to:

receive, subsequent to transmission of the encryption key, encrypted random data from the another computing device via a wireless transmission that requires pairing, wherein the encrypted random data comprises random data encrypted with the encryption key;

decrypt the encrypted random data received from the another computing device with the encryption key to obtain the random data;

add a time stamp to the random data;

re-encrypt the random data with the encryption key, wherein the re-encrypted random data includes the time stamp; and transmit the re-encrypted random data that includes the time stamp to the another computing device.

13. The computing device of claim 7, wherein the plurality of instructions further cause the processor to:
- regenerate the encryption key using audible background noise a random seed to the random number generator in response to a determination that the encryption key is not validated;
- generate another cryptographic picture based on the regenerated encryption key, wherein the another cryptographic picture includes the regenerated encryption key embedded in the another cryptographic picture;
- display the another cryptographic picture on the display of the computing device; and
- determine whether the regenerated encryption key has been successfully validated by the another computing device based on the another cryptographic picture.

14. A method for secure communications between a first computing device and a second computing device, the method comprising:
- communicating, by the first computing device while in a key exchange mode, with the second computing device via an in-band transmission channel;
- negotiating, by the first computing device and via the in-band transmission channel, with the second computing device to determine which computing device will generate an encryption key;
- generating, by the first computing device, the encryption key using audible background noise as a random seed to a random number generator in response to a determination that the first computing device is to generate the encryption key;
- generating, by the first computing device, a cryptographic picture based on the encryption key, wherein the cryptographic picture includes the encryption key embedded in the cryptographic picture;
- transmitting the encryption key to the second computing device, wherein transmitting the encryption key to the second computing device comprises displaying the cryptographic picture on a display of the first computing device such that the cryptographic picture is visible to the second computing device;
- determining, by the first computing device, whether the encryption key has been successfully validated by the second computing device based on the cryptographic picture; and
- automatically accepting, by the first computing device, communications from the second computing device over the in-band transmission channel in response to a determination that the encryption key has been successfully validated.

15. The method of claim 14, wherein negotiating with the second computing device comprises negotiating, by the first computing device, with the second computing device to determine which computing device will generate an encryption key based on a determination of which of the computing devices comprises more processing power.

16. The method of claim 14, wherein the encryption key has a character length greater than sixteen characters.

17. The method of claim 14, wherein determining whether the encryption key has been successfully validated by the second computing device comprises:
- receiving, subsequent to transmission of the encryption key, encrypted random data from the second computing device via a wireless transmission that requires pairing, wherein the encrypted random data comprises random data encrypted with the encryption key;
- decrypting the encrypted random data received from the second computing device with the encryption key to obtain the random data;
- adding a time stamp to the random data;
- re-encrypting the random data with the encryption key, wherein the re-encrypted random data includes the time stamp; and
- transmitting the re-encrypted random data that includes the time stamp to the another computing device.

18. The method of claim 14, further comprising:
- regenerating, by the first computing device, the encryption key using audible background noise a random seed to the random number generator in response to a determination that the encryption key is not validated;
- generating, by the first computing device, another cryptographic picture based on the regenerated encryption key, wherein the another cryptographic picture includes the regenerated encryption key embedded in the another cryptographic picture;
- displaying the another cryptographic picture on the display of the first computing device; and
- determining, by the first computing device, whether the regenerated encryption key has been successfully validated by the second computing device based on the another cryptographic picture.

* * * * *